United States Patent
Kuruvilla et al.

(10) Patent No.: US 11,298,827 B2
(45) Date of Patent: Apr. 12, 2022

(54) CALIBRATION APPARATUS AND CALIBRATION METHOD

(71) Applicant: Nidec Corporation, Kyoto (JP)

(72) Inventors: Vineet Jacob Kuruvilla, Singapore (SG); Haruhiro Tsuneta, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 190 days.

(21) Appl. No.: 16/687,752

(22) Filed: Nov. 19, 2019

(65) Prior Publication Data
US 2020/0189112 A1    Jun. 18, 2020

(30) Foreign Application Priority Data
Dec. 14, 2018 (JP) .............................. JP2018-234270

(51) Int. Cl.
*B25J 9/16* (2006.01)
(52) U.S. Cl.
CPC ........... *B25J 9/1692* (2013.01); *B25J 9/1653* (2013.01)
(58) Field of Classification Search
CPC . B25J 9/1692; B25J 9/1653; B25J 9/10; B25J 9/00; B25J 9/0009; B25J 9/1005; B25J 9/1015; B25J 9/102; B25J 13/089; B25J 9/1641; G05B 2219/39024
See application file for complete search history.

(56) References Cited

U.S. PATENT DOCUMENTS

| | | | |
|---|---|---|---|
| 2012/0215353 A1 | 8/2012 | Izumi et al. | |
| 2012/0239194 A1* | 9/2012 | Kagawa | B25J 9/1692 700/254 |
| 2016/0085887 A1* | 3/2016 | Hazan | B25J 9/1664 703/7 |
| 2016/0263747 A1* | 9/2016 | Yokoi | B25J 9/1692 |
| 2018/0089831 A1* | 3/2018 | Liu | G06T 7/70 |
| 2018/0200886 A1* | 7/2018 | Wang | B25J 9/1692 |
| 2019/0022866 A1* | 1/2019 | Kawase | B25J 9/1633 |
| 2019/0099887 A1* | 4/2019 | Huang | G01B 11/005 |
| 2019/0255708 A1* | 8/2019 | Fujita | B25J 13/08 |
| 2019/0386590 A1* | 12/2019 | Koike | H02P 5/747 |
| 2020/0039075 A1* | 2/2020 | Katsiaris | G01B 21/042 |

FOREIGN PATENT DOCUMENTS

| | | |
|---|---|---|
| JP | 2012-101306 A | 5/2012 |
| JP | 2012-171069 A | 9/2012 |
| JP | 2017-061022 A | 3/2017 |

* cited by examiner

*Primary Examiner* — Abby Y Lin
*Assistant Examiner* — Esvinder Singh
(74) *Attorney, Agent, or Firm* — Keating & Bennett

(57) ABSTRACT

A calibration apparatus of a robot that includes an arm, a joint attached to the arm, a motor provided to the joint, and a gear speed reducer provided between the motor and the joint includes setting circuitry that sets a destination position of the end of the arm in a predetermined three-dimensional space, acquiring circuitry that acquires an angle of the joint when the end of the arm is moved to the destination position, adjusting circuitry that adjusts the angle acquired by the acquiring circuitry in accordance with rotational angle transmission error in gears of the gear speed reducer, and correcting circuitry that corrects Denavit-Hartenberg (DH) parameters of the robot by using the angle adjusted by the adjusting circuitry.

5 Claims, 5 Drawing Sheets

DEFINITION OF DH PARAMETERS

| AXIS | d [mm] | θ [deg] | a [mm] | α [deg] |
|---|---|---|---|---|
| J1 | 87.0 | 90.0 +θ1 | 0.0 | 90.0 |
| J2 | 0.0* | 90.0 +θ2 | 485.0 | 0.0 |
| J3 | 0.0* | 90.0 +θ3 | 0.0 | 90.0 |
| J4 | 375.0 | θ4 | 0.0 | −90.0 |
| J5 | 100.0 | θ5 | 0.0 | 90.0 |
| J6 | 85.0 | θ6 | 0.0 | 0.0 |

* d2 AND d3 ARE OFFSET BY EACH OTHER WITH THE SAME AMOUNT OF OFFSET AND HANDLED AS 0.0.

CALIBRATION APPARATUS AND CALIBRATION METHOD

CROSS REFERENCE TO RELATED APPLICATION

The present application claims priority under 35 U.S.C. § 119 to Japanese Application No. 2018-234270 filed on Dec. 14, 2018, the entire contents of which are hereby incorporated herein by reference.

1. FIELD OF THE INVENTION

The present disclosure relates to a calibration apparatus and a calibration method.

2. BACKGROUND

A six-axis robot is known as an industrial articulated robot. When a robot is assembled at a factory or the like, it is difficult for an assembly worker to assemble a robot with intended design values, and as a result, an assembled robot includes assembly error. Usually, calibration is performed to reduce assembly error. A calibration apparatus for a robot is known. When assembly error in assembling a robot is calibrated, the adjustment of the robot is limited to one degree of freedom to improve the efficiency of calibration work.

A motor is provided for a joint portion of a robot. A speed reducer is provided between the motor and the joint portion. When the speed reducer uses gears, the gears have rotational angle transmission error. Therefore, assembly error in the robot includes error caused by the rotational angle transmission error. Rotational angle transmission error in gears is caused when two gears are engaged with each other to transmit rotation.

However, in the related art, there is no suggestion to reduce error caused by rotational angle transmission error in the gears of a speed reducer.

SUMMARY

A calibration apparatus according to an example embodiment of the present disclosure is a calibration apparatus of a robot that includes an arm, a joint attached to the arm, a motor provided to the joint, and a gear speed reducer provided between the motor and the joint. The calibration apparatus includes setting circuitry that sets a destination position of an end of the arm in a predetermined three-dimensional space, acquiring circuitry that acquires an angle of the joint when the end of the arm is moved to the destination position, adjusting circuitry that adjusts the angle acquired by the acquiring circuitry in accordance with rotational angle transmission error in gears of the gear speed reducer; and correcting circuitry that corrects a Denavit-Hartenberg (DH) parameter of the robot by using the angle adjusted by the adjusting circuitry.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described below in detail with reference to the drawings. The example embodiments described below are simply examples that implement the present disclosure and are appropriately corrected or modified according to the structure of the apparatus or system to which the present disclosure is applied and to other various conditions. Therefore, the present disclosure is not limited to the example embodiments below.

Figure 1:
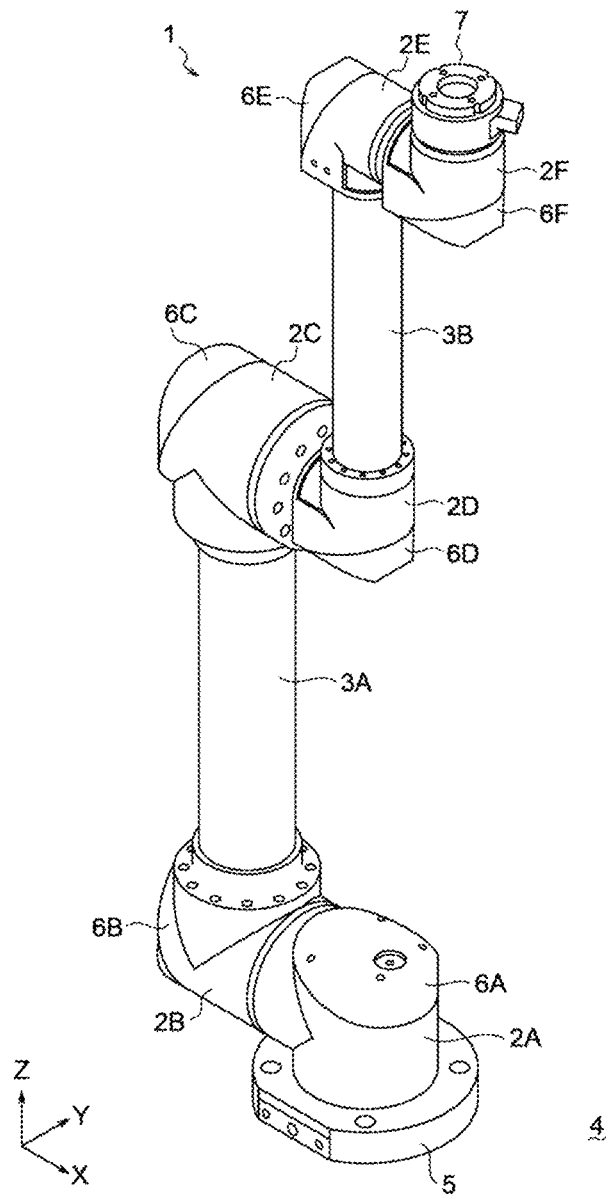
FIG. 1 is a perspective view of a robot according to an example embodiment of the present disclosure.
Figure 2:
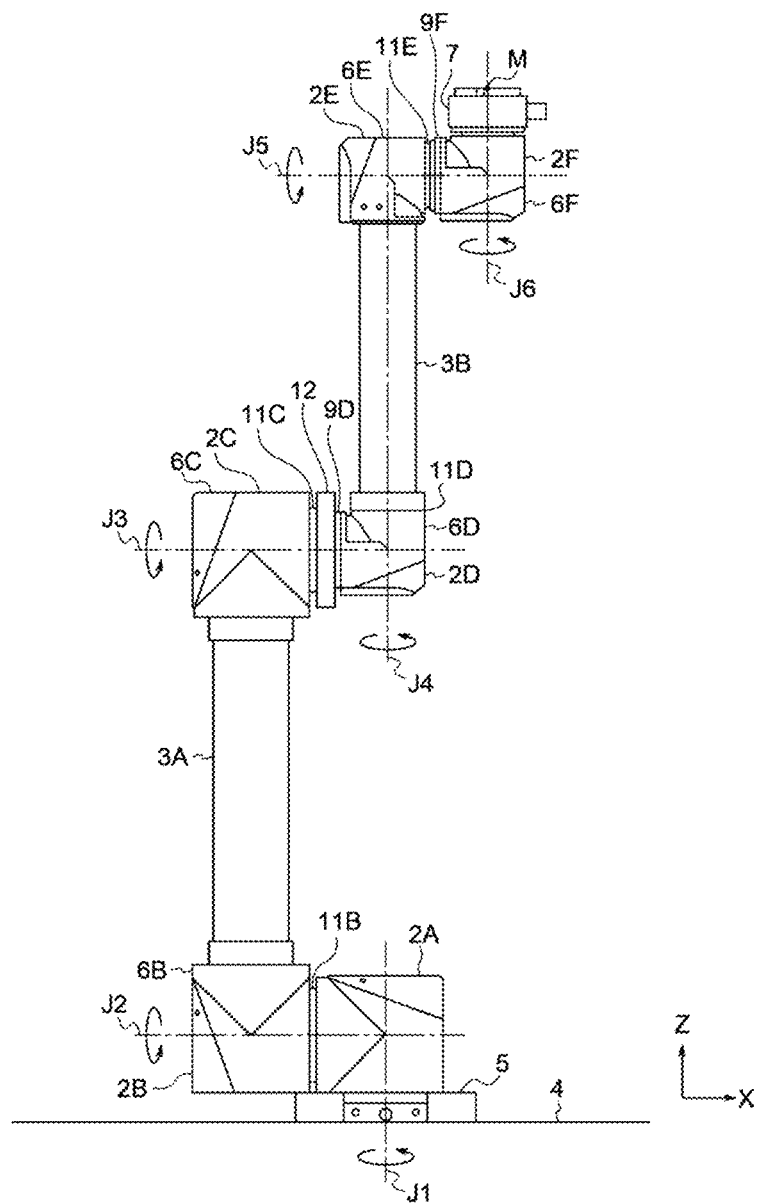
FIG. 2 is a left side view of the robot illustrated in FIG. 1.

FIG. 1 is a perspective view of a robot 1 to be calibrated by a calibration apparatus according to an embodiment of the present disclosure. For convenience of explanation, in FIG. 1, the upward direction is referred to as the Z direction, the right direction is referred to as the Y direction, and the direction from the sheet of the drawing toward the front side is referred to as the X direction. The Z direction is the height direction of the robot 1. The direction opposite to the Z direction is referred to as a downward direction. The same direction as the Z direction is referred to as an upward direction. FIG. 2 is a left side view of the robot 1 illustrated in FIG. 1.

The robot 1 is a six-axis robot that can be used in, for example, the assembly or manufacturing of a predetermined product. As illustrated in FIGS. 1 and 2, the robot 1 has six rotational joint portions 2A to 2F and two arms 3A and 3B. In the description below, the six rotational joint portions 2A to 2F are sequentially referred to as, starting from the rotational joint portion close to a robot mounting surface 4, the first rotational joint portion 2A, the second rotational joint portion 2B, the third rotational joint portion 2C, the fourth rotational joint portion 2D, the fifth rotational joint portion 2E, and the sixth rotational joint portion 2F. The two arms 3A and 3B are referred to as, starting from the arm close to the robot mounting surface 4, the first arm 3A and the second arm 3B. The joint portions may simply be referred to as the joints.

The robot 1 has a support member 5 forming a base portion of the robot 1. The support member 5 is fixed to the mounting surface 4. The first rotational joint portion 2A is linked to the support member 5 so as to be relatively swingable.

The first arm 3A and the second arm 3B are formed like elongated cylinders.

The first rotational joint portion 2A and the second rotational joint portion 2B are mutually linked so as to be relatively swingable. The second rotational joint portion 2B and a base (lower end) of the first arm 3A are fixed to each other. An end of the first arm 3A and the third rotational joint portion 2C are fixed to each other. The third rotational joint portion 2C and the fourth rotational joint portion 2D are mutually linked so as to be relatively swingable. The fourth rotational joint portion 2D and a lower end of the second arm 3B are mutually linked so as to be relatively swingable. An end of the second arm 3B and the fifth rotational joint portion 2E are fixed to each other. The fifth rotational joint portion 2E and the sixth rotational joint portion 2F are mutually linked so as to be relatively swingable. An attachment portion 7, to which an end effector or the like (not illustrated) can be attached so as to be relatively swingable, is attached to the sixth rotational joint portion 2F.

Each of the first rotational joint portion 2A to the sixth rotational joint portion 2F is provided with a motor (not illustrated), a speed reducer (not illustrated) linked to the motor, a position detecting mechanism (not illustrated) that detects a rotational position of the motor, a circuit board (not illustrated) by which the motor and the position detecting mechanism are electrically connected to each other, and a corresponding one of the cases 6A to 6F, in which the motor, the speed reducer, and the position detecting mechanism are accommodated. Each motor is connected to a controller (not illustrated) that controls the motor in a wireless or wired manner. The speed reducer has a predetermined number of gears. Since the speed reducer has gears, it is also referred to as the gear speed reducer. The speed reducer is disposed between the motor and the joint portion so that the rotation of the motor (specifically, the output shaft of the motor) is transmitted to the joint portion at a predetermined reduction ratio. When the motor is rotated, the joint portion is also rotated. When the joint portion is rotated, the end of the relevant arm of the robot can be moved.

The support member 5 and the first rotational joint portion 2A are linked by fixing an output-side member (not illustrated) of the first rotational joint portion 2A to the support member 5. The support member 5 and the first rotational joint portion 2A are linked together so that a central axis J1 of the first rotational joint portion 2A and a central axis of the support member 5 match.

The first rotational joint portion 2A and the second rotational joint portion 2B are linked together so that the central axis J1 of the first rotational joint portion 2A and a central axis J2 of the second rotational joint portion 2B are orthogonal to each other. The case 6A of the first rotational joint portion 2A and a flange portion 11B of the second rotational joint portion 2B are directly fixed to each other. Thus, the first rotational joint portion 2A and the flange portion 11B of the second rotational joint portion 2B are directly fixed to each other so that the central axis J1 of the first rotational joint portion 2A and the central axis J2 of the second rotational joint portion 2B are orthogonal to each other. The first rotational joint portion 2A and the second rotational joint portion 2B can swing with respect to the support member 5 with the central axis J1 of the first rotational joint portion 2A being the swing axis.

The second rotational joint portion 2B and the first arm 3A are linked together so that the central axis J2 of the second rotational joint portion 2B and a central axis of the first arm 3A in its longitudinal direction are orthogonal to each other. The lower end of the first arm 3A is fixed to the case 6B of the second rotational joint portion 2B.

The first arm 3A and the third rotational joint portion 2C are linked together so that the central axis of the first arm 3A in its longitudinal direction and a central axis J3 of the third rotational joint portion 2C are orthogonal to each other. The end of the first arm 3A is fixed to the case 6C of the third rotational joint portion 2C. The central axis J3 is parallel to the central axis J2.

The third rotational joint portion 2C and the fourth rotational joint portion 2D are linked together so that the central axis J3 of the third rotational joint portion 2C and a central axis J4 of the fourth rotational joint portion 2D are orthogonal to each other. An attachment surface 9D of the case 6D of the fourth rotational joint portion 2D and a flange portion 11C of the third rotational joint portion 2C are fixed to each other with a linkage member 12 interposed therebetween. The linkage member 12 has a predetermined thickness (length) in the direction of the central axis J3 of the third rotational joint portion 2C. The central axis J4 and central axis J1 are concentric.

The fourth rotational joint portion 2D and the second arm 3B are linked together so that the central axis J4 of the fourth rotational joint portion 2D and a central axis of the second arm 3B in its longitudinal direction match. The lower end of the second arm 3B is fixed to a flange portion 11D of the fourth rotational joint portion 2D.

Therefore, the second arm 3B can swing with respect to the first arm 3A with the central axis J3 of the third rotational joint portion 2C being the swing axis.

The second arm 3B and the fifth rotational joint portion 2E are linked together so that the central axis of the second arm 3B in its longitudinal direction and a central axis J5 of the fifth rotational joint portion 2E are orthogonal to each other. The end of the second arm 3B is fixed to the case 6E of the fifth rotational joint portion 2E. The central axis J5 is parallel to the central axis J2 and the central axis J3.

The fifth rotational joint portion 2E and the sixth rotational joint portion 2F are linked together so that the central axis J5 of the fifth rotational joint portion 2E and a central axis J6 of the sixth rotational joint portion 2F are orthogonal to each other. An attachment surface 9F of the case 6F of the sixth rotational joint portion 2F and a flange portion 11E of the fifth rotational joint portion 2E are directly fixed to each other.

Therefore, the second arm 3B, which is relatively swingable with respect to the first arm 3A with the central axis J3 of the third rotational joint portion 2C being the swing axis, can swing on a plane including the central axis J1 of the first rotational joint portion 2A. The second arm 3B is shorter than the first arm 3A so that when the second arm 3B swings around the central axis J3, interference does not occur between the first rotational joint portion 2A and the fifth rotational joint portion 2E.

In this embodiment, the end of the robot arm is positioned at a point M in FIG. 2. In this embodiment, a laser tracker is used as a measurement instrument that measures the position of the point M. On the attachment portion 7 to which the end effector or the like can be attached, a mirror (not illustrated) that reflects a laser beam emitted from the laser tracker is attached at the position M. The laser tracker is set so that measured values are sent to the calibration apparatus.

A robot is assembled at a factor or the like by an assembly worker. Usually, it is difficult for an assembly worker to assemble a robot with intended design values, and an assembled robot includes assembly error. In this embodiment, assembly error in a robot is a difference between a commanded position indicated by a movement command issued to a robot arm and a position to which the end of the robot arm has actually moved. Assembly error is represented by Equation (1) below. Specifically, assembly error is considered to include "DH parameter error" which is error resulting from error included in DH parameters at design time, and error caused by rotational angle transmission error in gears of a speed reducer when the rotation of a motor is transmitted to a joint portion. In this embodiment, calibration refers to minimizing the assembly error. DH is an abbreviation of Denavit-Hartenberg.

Assembly error=error in DH parameters+error caused by rotational angle transmission error in gears of speed reducer  (1).

Figure 3:
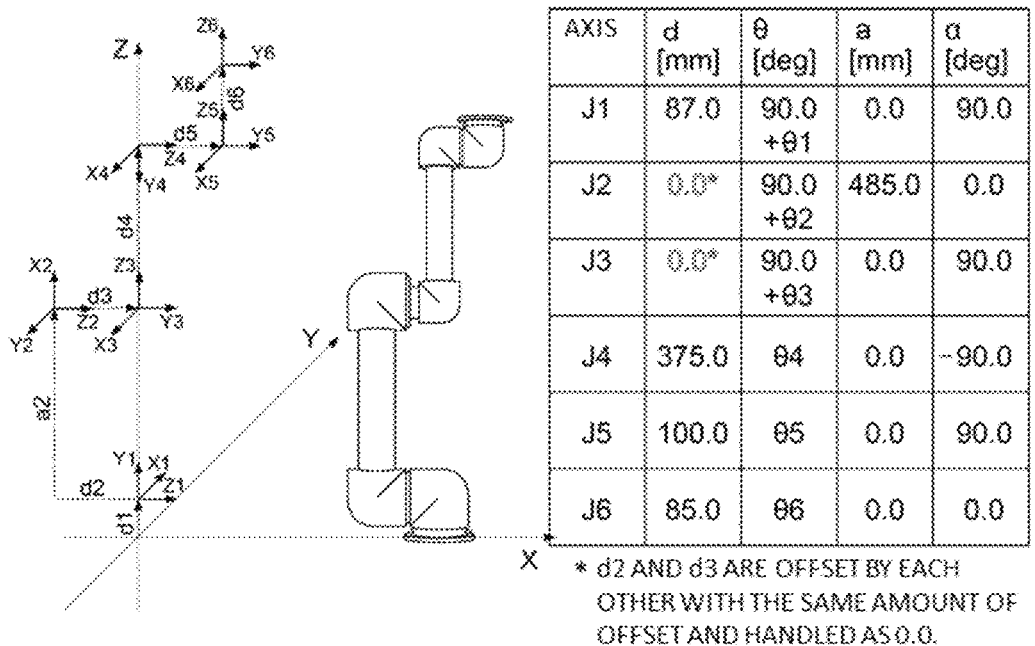
FIG. 3 is a diagram describing DH parameters according to an example embodiment of the present disclosure.

FIG. 3 is a diagram describing DH parameters. In FIG. 3, "d" indicates the amount of movement (mm) in the Z-axis direction, "θ" indicates the amount of rotation (degrees) around the Z axis, "a" indicates the amount of movement (mm) in the X-axis direction, and "α" indicates the amount of rotation (degrees) around the X axis. DH parameters include four parameters (d, θ, a, and α). In this embodiment, θ of each of the axes J1 to J6 is described as corresponding one of θ1 to θ6 and referred to as a joint angle. The DH parameters indicated in FIG. 3 are an example of DH parameters (nominal values or specification values) at design time. The numerical values indicated in FIG. 3 are merely an example. The DH parameters can take other values. DH parameters at design time are also referred to as nominal DH parameters.

In this embodiment, a joint angle that minimizes "error caused by rotational angle transmission error in gears of speed reducer" in Equation (1) is obtained, and calibration is then performed to eliminate or minimizes assembly error (error in DH parameters) caused at the obtained joint angle.

Figure 4:
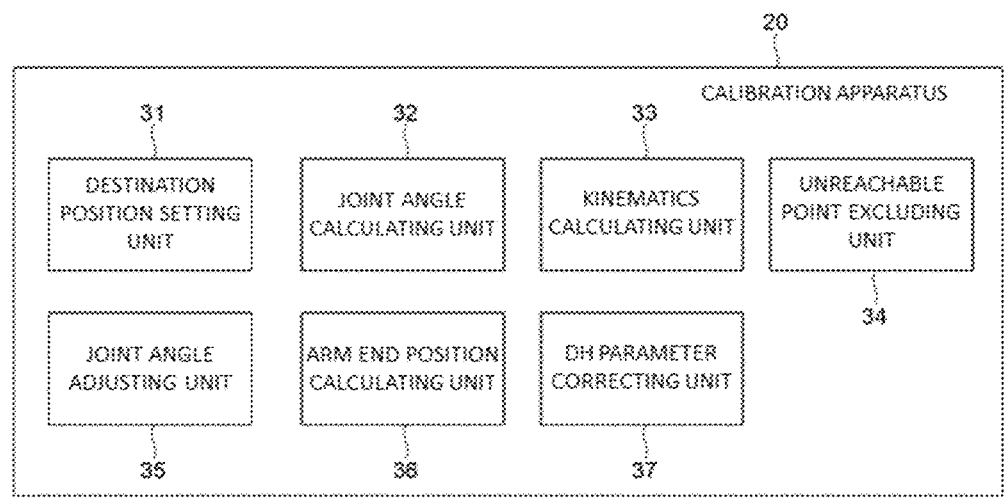
FIG. 4 is a functional block diagram of a calibration apparatus according to an example embodiment of the present disclosure.

FIG. 4 is a functional block diagram of a calibration apparatus 20 in this embodiment.

The calibration apparatus 20 has a destination position setting circuitry 31, a joint angle calculating unit 32, a kinematics calculating unit 33, an unreachable point excluding circuitry 34, a joint angle adjusting circuitry 35, an arm end position calculating unit 36, and a DH parameter correcting circuitry 37.

The destination position setting circuitry 31 sets a destination position for the end of the robot arm in a predetermined three-dimensional space. The predetermined three-dimensional space is a robot workspace that is set by the destination position setting circuitry 31 in accordance with, for example, a value input into the calibration apparatus 20 by the user of the calibration apparatus 20. The destination position setting circuitry 31 sets a plurality of destination positions for the end of the robot arm in the above described three-dimensional space. Setting a robot workspace and destination positions is described later with reference to FIG. 7.

The joint angle calculating unit 32 calculates the joint angle of the robot 1 for each of the destination positions that are set (that is, corresponding to each of the destination positions that are set). That is, the joint angle calculating unit 32 calculates and acquires a joint angle that is reached when the end of the arm of the robot 1 is moved to each destination position that is set. Specifically, the joint angle calculating unit 32 calculates a robot joint angle corresponding to each destination position through an inverse kinematics (IK) computation performed by using DH parameters at design time and acquires the calculated joint angle.

The kinematics calculating unit 33 performs an inverse kinematics computation when the joint angle calculating unit 32 calculates a joint angle of the robot 1. The kinematics calculating unit 33 also performs a forward kinematics (FK) computation when the arm end position calculating unit 36 calculates the position of the end of the robot arm.

The unreachable point excluding circuitry 34 excludes, if the destination positions that are set include a position where the robot arm end cannot reach (the position is referred to as an unreachable point), the unreachable point from the destination positions that are set.

The joint angle adjusting circuitry 35 adjusts the joint angle calculated by the joint angle calculating unit 32 in accordance with the rotational angle transmission error in the gears of the gear speed reducer (the adjusted joint angle may also be referred to as the joint angle after correction). Adjustment of the joint angle is described later with reference to FIGS. 6 and 8.

The arm end position calculating unit 36 calculates and acquires the position of the end of the robot arm through a forward kinematics computation performed by using the adjusted joint angle and DH parameters at design time.

The DH parameter correcting circuitry 37 corrects the DH parameters at design time by using the joint angle acquired by the joint angle adjusting circuitry 35 (the joint angle adjusted).

Figure 5:
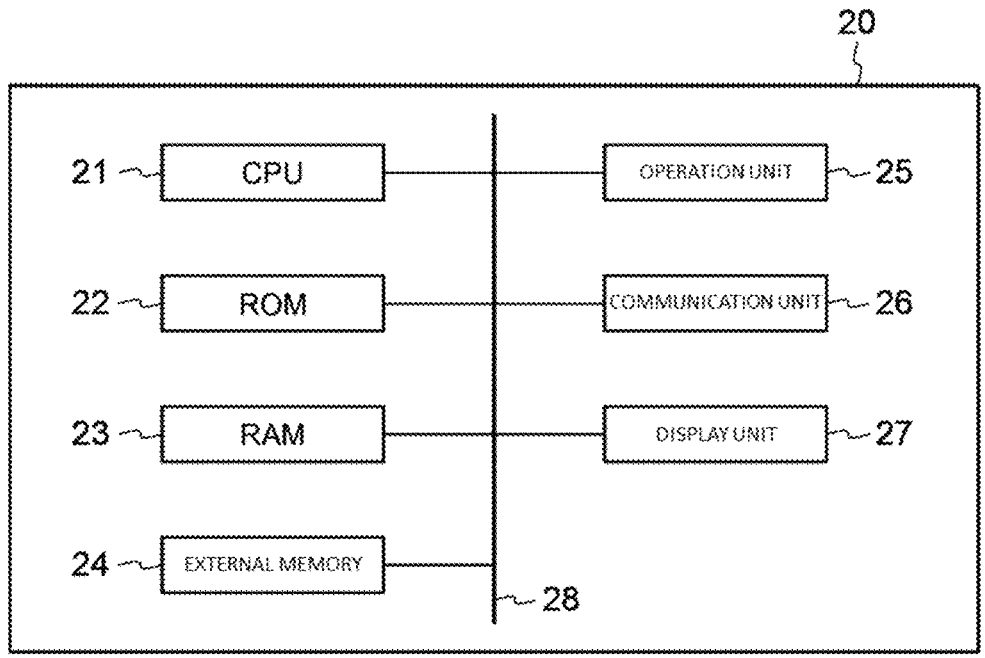
FIG. 5 is a block diagram illustrating a hardware structure of a calibration apparatus according to an example embodiment of the present disclosure.

FIG. 5 is a block diagram illustrating the hardware structure of the calibration apparatus 20.

The calibration apparatus 20 has a central processing unit (CPU) 21, a read-only memory (ROM) 22, a random-access memory (RAM) 23, an external memory 24, an operation unit (input unit) 25, a communication unit (including a network interface) 26, and a display unit (output unit) 27. The CPU 21, the ROM 22, the RAM 23, the external memory 24, the operation unit 25, the communication unit 26, and the display unit 27 are mutually connected through a bus 28.

The CPU 21 is a controller that integrally controls the calibration apparatus 20. That is, the CPU 21 controls the units denoted by 22 to 27 that constitute the calibration apparatus 20. The CPU 21 includes, for example, one or a plurality of processors.

The ROM 22 stores programs and the like that are necessary for the CPU 21 to execute processing. When the CPU 21 executes processing according to programs stored in the ROM 22, processing indicated in a flowchart (FIG. 6) described later is executed. In addition, when the CPU 21 executes processing according to programs stored in the ROM 22, the communication unit 26 and display unit 27 in the calibration apparatus 20 may be controlled. These programs and the like may be stored in the external memory 24 or a removable storage medium (not illustrated). The RAM 23 is used by the CPU 21 to load programs that the CPU 21 has read from the ROM 22 and to execute the loaded programs. The RAM 23 is also used as a temporary storage memory that is a storage area to temporarily store data for various types of processing. The RAM 23 stores DH parameters at design time.

The external memory 24 stores, for example, various types of data and information that are necessary for the CPU 21 to execute processing by using programs. The external memory 24 also stores, for example, various types of data and information that are obtained when the CPU 21 executes processing by using programs.

The operation unit 25 includes a keyboard, switches, a power switch, a numeric keypad, and the like. The user can use the operation unit 25 to input desired data and numeric values into the calibration apparatus 20. The user can also uses the operation unit 25 to issue a command to the laser tracker. Since the operation unit 25 accepts a command from the user, the operation unit 25 may be referred to as the input unit.

The communication unit 26 is a circuit that has a network interface and communicates with the laser tracker and the like through a network (not illustrated). For example, through the communication unit 26, the calibration apparatus 20 can transmit a command to the laser tracker and cause the laser tracker to transmit measured values to the calibration apparatus 20.

The display unit 27 includes a display on which an image is displayed. The display unit 27 can display a moving picture and a still picture. The display unit 27 may include a voice output unit. The display unit 27 may function as a user interface when the display unit 27 is used as a touch panel. Since the display unit 27 outputs an image, the display unit 27 may be referred to as the output unit. The calibration apparatus 20 may have hardware elements and functional units other than the constituent elements illustrated in FIGS. 4 and 5. The structures in FIGS. 4 and 5 are merely an example. A plurality of units may constitute a single unit, and any one unit may be divided into a plurality of functional units.

Figure 6:
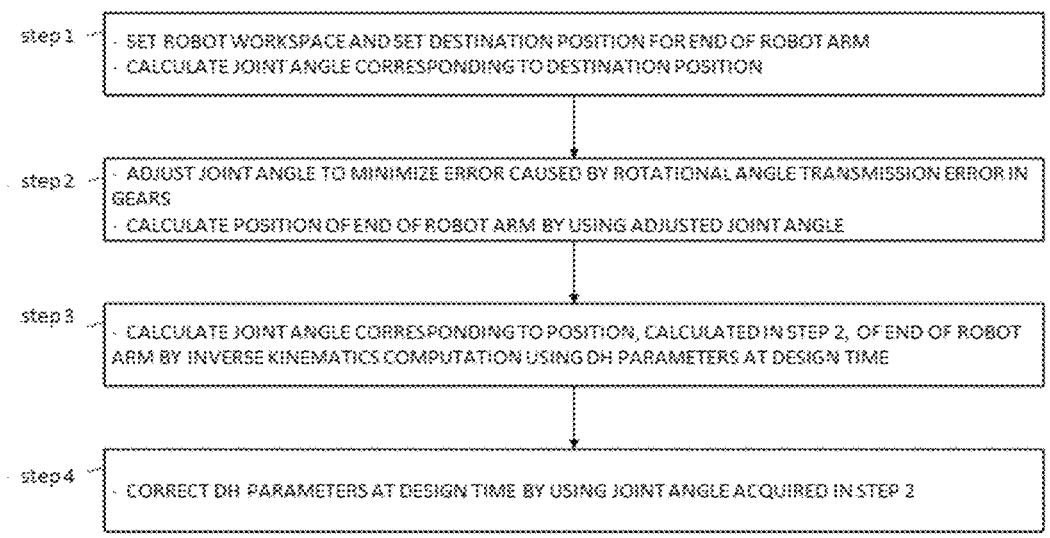
FIG. 6 is a flowchart for calibration according to an example embodiment of the present disclosure.

FIG. 6 is a flowchart to explain calibration in this embodiment. When the CPU 21 in the calibration apparatus 20 executes programs stored in the ROM 22 or the like, processing according to this flowchart is performed. The flowchart in FIG. 6 is started when, for example, the calibration apparatus 20 is powered on or the user of the calibration apparatus 20 issues a start command.

In step 1, the calibration apparatus 20 first sets a robot workspace and sets (determines) a destination position for the end of the robot arm.

Figure 7:
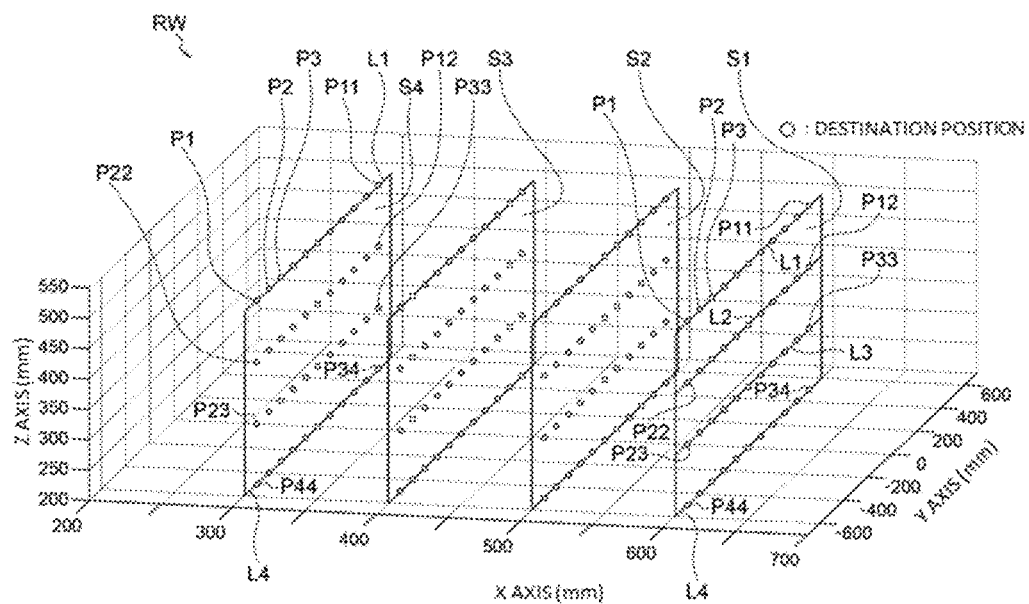
FIG. 7 is a diagram illustrating measurement points according to an example embodiment of the present disclosure.

FIG. 7 illustrates processing in which the calibration apparatus 20 sets a robot workspace RW and determines the destination position for the end of the robot arm. As illustrated in FIG. 7, the calibration apparatus 20 first determines a range in an XYZ coordinate system as the robot workspace RW. In this embodiment, the robot workspace RW is set within a range of 300 mm to 700 mm in the X-axis direction, within a range of −700 mm to 700 mm in the Y-axis direction, and within a range of 200 mm to 500 mm in the Z-axis direction. The calibration apparatus 20 also sets four planes S1 to S4 in the robot workspace RW parallel to a plane defined by the Y axis and Z axis. The planes S1 to S4 are spaced at intervals of 100 mm in the X-axis direction. The robot workspace RW is a predetermined three-dimensional space.

The numeric values described above of the ranges of the robot workspace RW are input into the calibration apparatus 20 by the user of the calibration apparatus 20 through the operation unit 25, and the destination position setting circuitry 31 performs setting according to the input values.

Subsequently, the calibration apparatus 20 sets, on each of the planes S1 to S4, a predetermined number of destination positions P1 to P44 at predetermined (equal) intervals. The predetermined interval (for example, a distance from P1 to P2) is, for example, 50 mm to 100 mm. In the example in FIG. 7, the predetermined interval is 100 mm. As illustrated in FIG. 7, the point at the upper left of the plane S1 is a first destination position P1, and other 10 destination positions P2, P3, . . . , P11 are set along the Y axis at 100-mm intervals starting from the destination position P1. A line defined by the destination positions P1 to P11 is referred to as a line L1. The line L1 extends along the upper edge of the rectangle of the plane S1.

The positions of the planes S1 to S4 and the values of the destination positions P1 to P44 are set by the destination position setting circuitry 31 according to numerical values, such as coordinate values, intervals, and the like, input into the calibration apparatus 20 by the user of the calibration apparatus 20 through the operation unit 25.

Next, the calibration apparatus 20 sets a line L2, defined by the destination positions P12 to P22, below the line L1. The line L2 is parallel to the line L1 and extends 100 mm below the line L1 in the Z direction. The destination position P12 is immediately below the destination position P11, and the destination position P22 is immediately below the destination position P1. The calibration apparatus 20 further sets a line L3 defined by the destination positions P23 to P33 below the line L2, and sets a line L4 defined by the destination positions P34 to P44 below the line L3. The four lines L1 and L4 are mutually parallel on each of which 11 destination positions are set. In the description below, the destination positions P1 to P44 may be collectively referred to as destination positions P.

On each of the planes S2 to S4 as well, the calibration apparatus 20 sets the four lines L1 to L4 as on the plane S1. On the lines of the planes S2 to S4, the destination positions P1 to P44 are set. Values of the X, Y, and Z coordinates of the destination position P1 on the plane S4 are respectively 300 mm, −500 mm, and 500 mm.

The number of destination positions P set on a single plane is not limited to 44. The reason why the destination position P12, which follows the destination position P11, is placed immediately below the destination position P11 is to ensure uniformity in error caused by gear backlash in the measurement of the position of the end of the arm.

Next, in step 1, the calibration apparatus 20 calculates and acquires joint angles of the robot 1 for the destination positions P1 to P44 on the plane S1. That is, the calibration apparatus 20 calculates and acquires the joint angle corresponding to each destination position. Specifically, the calibration apparatus 20 performs an inverse kinematics computation by using the coordinate values of the destination positions P1 to P44 and the DH parameters at design time to acquire and calculate joint angles of the robot corresponding to the destination positions P1 to P44.

After having acquired the joint angles of the robot corresponding to the destination positions P1 to P44 on the plane S1, the calibration apparatus 20 calculates joint angles of the robot for the destination positions P1 to P44 on each of the planes S2 to S4 as well. According to such processing, joint angles of the robot can be acquired for the destination positions P1 to P44 on each of the planes S1 to S4. For example, values of the joint angles θ1, θ2, θ3, θ4, θ5, and θ6 of the robot corresponding to the destination position P1 on the plane S4 are respectively, −158.911, −26.598, −45.731, −180.0, 107.670, and 111.088. Joint angles are measured in degrees (deg).

If the destination positions P on the planes S1 to S4 include a position that the robot arm cannot reach, that is, an unreachable point, the calibration apparatus 20 performs, in step 1, processing to exclude the unreachable point from the destination positions P on the planes S1 to S4. The processing to exclude the unreachable point is performed so as to prevent the unreachable point from being used in a calibration process. Whether the destination position is an unreachable point is decided by the unreachable point excluding circuitry 34 in accordance with the result of the inverse kinematics computation.

After step 1, the processing proceeds to step 2. In step 2, the calibration apparatus 20 adjusts the joint angle acquired in step 1 so as to minimize error caused by rotational angle transmission error in the gears of the speed reducer. Specifically, the calibration apparatus 20 first rounds off the joint angle acquired in step 1 to the nearest integer multiple of 180 degrees. Equations (2) and (3) below are used in the rounding off of the joint angle to the nearest integer multiple of 180 degrees.

$$\text{joint\_angle\_motor\_side} = \text{joint\_angle} \times \text{gear\_ratio} \quad (2)$$

$$\text{rotation\_180 deg} = \text{round}(\text{joint\_angle\_motor\_side}/180.0) \quad (3)$$

Each of the motors that rotate the axes J1 to J6 of the robot transmits the rotation of the motor to the relevant axis, that is, corresponding one of the axes J1 to J6 of the robot through gears having a predetermined gear ratio. The gear ratio is, for example, 100:1.

First, the calibration apparatus 20 calculates a joint angle (joint_angle_motor_side) on the motor side according to Equation (2). The joint angle on the motor side is obtained by multiplying the actual joint angle, which is acquired in step 1, by 100, which is the gear ratio. Next, the calibration apparatus 20 rounds the joint angle on the motor side to an integer multiple of 180 degrees according to Equation (3). The reason why the joint angle on the motor side is divided by 180 in the right side of the Equation (3) is that the value of the joint angle at the 180-degree rotational angle position of the motor is the least likely to be affected by rotational angle transmission error in the gears. The finding that the value of the joint angle at the 180-degree is the least likely to be affected by rotational angle transmission error in the gears was obtained by the inventors of the present disclosure in experiments (described later with reference to FIG. 8).

Figure 8:
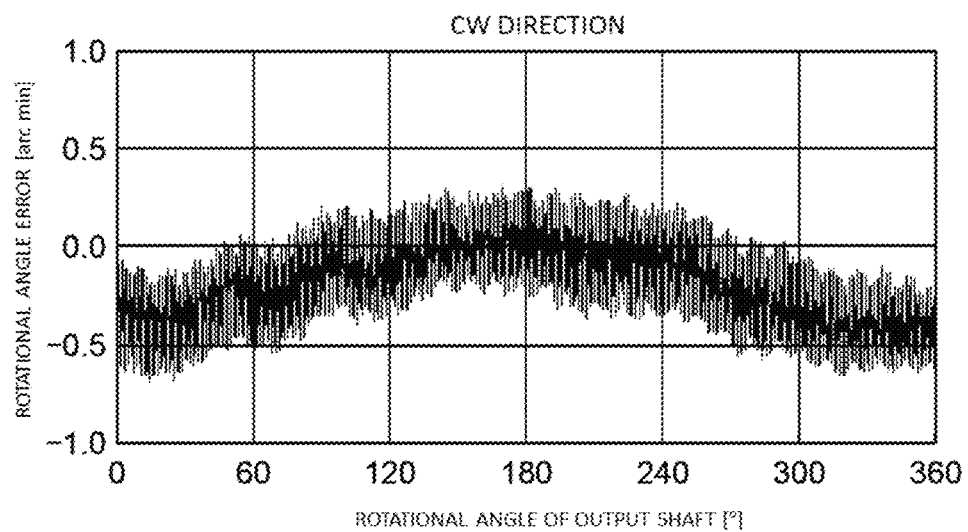
FIG. 8 is a graph describing rotational angle transmission error when gears of a speed reducer are rotated according to an example embodiment of the present disclosure.

FIG. 8 is a graph to explain influence by rotational angle transmission error in gears. The graph in FIG. 8 is obtained when the output shaft of the motor is rotated clockwise. In FIG. 8, the vertical axis of the graph represents rotational angle error (minutes) and the horizontal axis indicates the rotational angle (degrees) of the output shaft of the motor. The graph in FIG. 8 represents data that the inventors of this application obtained in experiments. As indicated in FIG. 8, it is found that variations in rotational angle error are minimum around 180 degrees. It was also confirmed in the experiments by the inventors that error variations appear in a cycle of 180 degrees. CW in FIG. 8 is an abbreviation of "clockwise".

Next, the calibration apparatus 20 calculates a joint angle after correction by using Equation (4).

$$\text{joint\_angle\_after\_correction} = \text{rotation\_180 deg} \times 180 \times \text{gear\_ratio}^{-1} \quad (4)$$

Specifically, the calibration apparatus 20 acquires a joint angle after correction by multiplying the angle obtained from Equation (3) by 180 and 1/100 (reciprocal of the gear ratio). For example, values of the joint angles after correction θ1, θ2, θ3, θ4, θ5, and θ6 of the robot corresponding to the destination position P1 on the plane S4 are respectively, −158.4, −27, −45, −180.0, 108, and 111.6.

Subsequently, the calibration apparatus 20 performs, in step 2, a forward kinematics computation by using the joint angles after correction and the DH parameters at design time to calculate and acquire the position of the end of the robot arm.

The "acquisition of the angle after correction" in step 2 is performed by the joint angle adjusting circuitry 35. The "acquisition of the angle after correction" is a process in which the angle acquired by the joint angle calculating unit 32 is adjusted in accordance with rotational angle transmission error in the gears of the gear speed reducer.

In step 3, the calibration apparatus 20 calculates a joint angle for the position of the end of the robot arm, the position having been acquired in step 2, through an inverse kinematics computation performed by using the DH parameters at design time. This calculation is performed so as to exclude an unreachable destination position (unreachable point) after the joint angle correction in step 2. The unreachable point excluding circuitry 34 excludes the unreachable point from the destination positions P in accordance with the joint angle calculated in step 3.

After the completion of step 3, the total number of destination positions P on the planes S1 to S4 is preferably 50 or more. This is because 50 equations are solved in DH parameter calculation. If excessive destination positions P are set, it may take much time for calculation or calculation results may include variations. Therefore, the number of destination positions P is preferably, for example, 59 or less.

In step 4, the calibration apparatus 20 corrects the DH parameters at design time by using the joint angle acquired in step 2. The joint angle acquired in step 2 is the joint angle in a state in which the joint angle is the least likely to be affected by rotational angle transmission error in the gears of the speed reducer. If the DH parameters are corrected when "error caused by rotational angle transmission error in gears of speed reducer", which is a second item in the right side in Equation (1), is minimized, the DH parameters can be highly precisely corrected.

The DH parameters are corrected so that at the joint angle acquired in step 2, the difference between the destination position of the end of the robot arm and the position to which the end of the robot arm is actually moved becomes zero or is minimized. In this case, the calibration apparatus 20 transmits a command to the robot 1 so that the end of the robot arm is moved to the destination position. The position to which the end of the robot arm is actually moved is measured by the laser tracker. The laser tracker transmits a measured value to the calibration apparatus 20. By receiving the measured value from the laser tracker, the calibration apparatus 20 acquires the position to which the end of the robot arm is actually moved. The calibration apparatus 20 corrects the DH parameters so that the difference between the commanded value and the position to which the end of the robot arm is actually moved becomes zero. The above correction of the DH parameters is performed by the DH parameter correcting circuitry 37.

According to the embodiment, error caused by rotational angle transmission error in the gears of a speed reducer is eliminated or minimized before DH parameters are corrected. This eliminates or reduces the possibility that DH parameter calculation diverges. In the related art, DH parameters are corrected in a state in which error caused by rotational angle transmission error in the gears of a speed reducer is included, and thus there is a possibility that DH parameter calculation does not converge but diverges. According to the embodiment, such possibility is reduced.

According to the embodiment, since error caused by rotational angle transmission error in the gears of a speed reducer is eliminated or minimized before DH parameters are corrected as described above, DH parameters are able to be appropriately corrected. If DH parameters are corrected in a state in which error caused by rotational angle transmission error in the gears of a speed reducer is included, DH parameters cannot be appropriately corrected. According to the embodiment, however, DH parameters can be more accurately corrected. That is, according to the embodiment, after error caused by rotational angle transmission error in the gears of a speed reducer is eliminated or minimized, error in DH parameters is made zero. This enables accurate calibration.

Since the total number of destination positions on the surfaces S1 to S4 is set to 50 or more when step 3 is completed, DH parameters can be calculated without the calculation diverging.

In the above embodiment, an example in which a six-axis robot is used to perform calibration, and applications of this embodiment are not limited to a six-axis robot. This embodiment can be applied to any robot if the robot has a joint. The number of destination positions P may be increased or decreased according to the number of equations to be used in DH parameter calculation. That is, any number of destination positions P may be set as long as equations to be used in DH parameter calculation converge and the calculation is completed within a predetermined time.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A calibration apparatus of a robot that includes an arm, a joint attached to the arm, a motor provided to the joint, and a gear speed reducer provided between the motor and the joint, the robot extending in a width direction, a length direction, and a height direction, the calibration apparatus comprising:
   a setting circuitry that sets a destination position of an end of the arm in a predetermined three-dimensional robot workspace which extends in parallel with a plane defined by the width direction and the length direction;
   an acquiring circuitry that acquires an angle of the joint when the end of the arm is moved to the destination position;
   an adjusting circuitry that adjusts the angle acquired by the acquiring circuitry in accordance with a rotational angle transmission error in gears of the gear speed reducer; and
   a correcting circuitry that corrects a Denavit-Hartenberg (DH) parameter of the robot by using the angle adjusted by the adjusting circuitry; wherein
   the setting circuitry is configured to set multiple planes in the robot workspace which are parallel to a plane defined by the length direction and the height direction, the destination position being included within one of the multiple planes;
   the adjusting circuitry is configured to adjust the angle in accordance with the rotational angle transmission error when a rotational angle of the motor is determined to be a predetermined angle; and
   the predetermined angle is a multiple of 180 degrees.

2. The calibration apparatus according to claim 1, wherein a number of destination positions is determined in accordance with a number of equations to be used to correct the DH parameter.

3. The calibration apparatus according to claim 1, further comprising:
   excluding circuitry that excludes, from destination positions set by the setting circuitry, an unreachable destination position that the end of the arm fails to reach.

4. The calibration apparatus according to claim 3, wherein after the unreachable destination position is removed, the number of destination positions is 50 or more.

5. A calibration method of a robot that includes an arm, a joint attached to the arm, a motor provided to the joint, and a gear speed reducer provided between the motor and the joint, the robot extending in a width direction, a length direction, and a height direction, the method comprising:
   setting a destination position of an end of the arm in a predetermined three-dimensional robot workspace which extends in parallel with a plane defined by the width direction and the length direction;
   acquiring an angle of the joint when the end of the arm is moved to the destination position;
   adjusting the angle acquired by the acquiring in accordance with rotational angle transmission error in gears of the gear speed reducer; and
   correcting a Denavit-Hartenberg (DH) parameter of the robot by using the angle adjusted by the adjusting; wherein the method further comprises
   setting multiple planes in the robot workspace which are parallel to a pane defined by the length direction and the height direction, the destination position being included within one of the multiple planes;
   adjusting the angle in accordance with the rotational angle transmission error when a rotational angle of the motor is determined to be a predetermined angle; and
   the predetermined angle is a multiple of 180 degrees.

* * * * *